United States Patent [19]

Fischer et al.

[11] 4,332,935

[45] Jun. 1, 1982

[54] PROCESS FOR THE PRODUCTION OF CATIONIC STARCH ETHERS

[75] Inventors: Wolfgang Fischer, Kahl; Manfred Langer, Karlstein; Gerhard Pohl, Hanau, all of Fed. Rep. of Germany

[73] Assignee: Degussa Aktiengesellschaft, Frankfurt, Fed. Rep. of Germany

[21] Appl. No.: 214,284

[22] Filed: Dec. 8, 1980

[30] Foreign Application Priority Data

Dec. 12, 1979 [DE] Fed. Rep. of Germany ....... 2949886

[51] Int. Cl.³ ...................... C08B 31/08; C08B 31/12
[52] U.S. Cl. ........................................ 536/50; 536/111
[58] Field of Search .................................. 536/50, 111

[56] References Cited

U.S. PATENT DOCUMENTS

| 2,876,217 | 3/1959 | Paschall | 536/50 |
| 3,243,426 | 3/1966 | Caesar | 536/50 |
| 3,346,563 | 10/1967 | Shildneck | 536/50 |
| 3,422,087 | 1/1969 | Caesar | 536/50 |
| 3,448,101 | 6/1969 | Billy | 536/50 |
| 3,637,656 | 1/1972 | Germino et al. | 536/50 |
| 3,721,575 | 3/1973 | Jarowenko | 536/50 |
| 4,127,563 | 11/1978 | Rankin et al. | 536/50 |

FOREIGN PATENT DOCUMENTS 699812  12/1964  Canada ................................. 536/50

Primary Examiner—Ronald W. Griffin
Attorney, Agent, or Firm—Cushman, Darby & Cushman

[57] ABSTRACT

The known process for the production of cationic starch ethers by the reaction of starch with cationic etherifying agents in the presence of water in an alkaline medium is improved by reacting the starch at a temperature of about 50° to 120° C. with an alkylidene epoxide which has a tertiary amino group or quaternary ammonium group in a medium which contains about 10 to 35 weight percent water and about 0.2 to 2.0 weight percent calcium hydroxide or calcium oxide. There are produced in short reaction times yields not previously attainable.

20 Claims, No Drawings

PROCESS FOR THE PRODUCTION OF CATIONIC STARCH ETHERS

BACKGROUND OF THE INVENTION

The invention is directed to a process for the production of cationic starch ethers by reacting starch with an alkylidene epoxide in alkaline medium in the presence of water.

It is known to cationize starch or starch containing substances by reaction with cationic etherifying agents. The reaction is particularly carried out in the presence of small amounts of water at room temperature or up to 200° C. with alkylidene epoxides which have a tertiary amino group or a quaternary ammonium group (Caesar U.S. Pat. No. 3,422,087 and Billy U.S. Pat. No. 3,448,010; The entire disclosure of the Caesar and Billy patents are hereby incorporated by reference) or in the presence of only small amounts of water with addition of, in a given case, halogenated hydrocarbons and with addition of strongly alkaline acting materials at temperatures of 30° to 80° C. with halogenated tertiary amines or quaternary ammonium salts or alkylidene epoxides which have a tertiary amino group or a quaternary ammonium group (Caesar U.S. Pat. No. 3,243,426) or in the presence of large amounts of water with addition of strongly alkaline acting materials at room temperature or slightly elevated temperature with alkylidene epoxides or alkylidene halohydrins which have a quaternary ammonium group (Paschall U.S. Pat. No. 2,876,217 or Schildneck U.S. Pat. No. 3,346,563; the entire disclosure of the Paschall and Schildneck patents is hereby incorporated by reference). In all known processes the yields of etherified starch, based on the amount of etherifying agent employed are unsatisfactory.

SUMMARY OF THE INVENTION

There has now been found a process for the production of cationic starch ethers by reaction of starch with alkylidene epoxides in alkaline medium in the presence of water wherein the starch is reacted at temperatures of about 50° to 120° C. with alkylidene epoxides having a tertiary amino group or a quaternary ammonium group and the reaction takes place in a medium that contains about 10 to 35 weight percent of water and about 0.2 to 2.0 weight percent of calcium hydroxide or calcium oxide. There are produced in this process better yields in substantially shorter reaction time than in the known processes.

There can be used native or modified starch or starch containing materials of any source for the production of cationic starch ethers according to the invention. With particular advantage there is used native wheat, corn or potato starch.

According to the invention the etherification of the starch takes place with alkylidene epoxides of the general formula

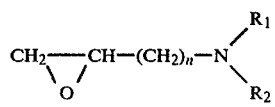

or preferably

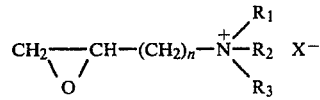

where n is a number from 1 to 3 and $R_1$, $R_2$ and $R_3$ are the same or different lower alkyl groups with 1 to 4 carbon atoms, e.g. methyl, ethyl, propyl, isopropyl, butyl, where $R_1$ and $R_2$ can be joined to form a cycloalkylene ring and X is an inorganic or organic salt anion such as halide, e.g. chloride, bromide, fluoride or iodide, nitrate, sulfate, acetate or formate.

Examples of alkylidene epoxides are glycidyl trimethyl ammonium chloride, glycidyl trimethyl ammonium bromide, glycidyl trimethyl ammonium iodide, glycidyl trimethyl ammonium sulfate, glycidyl trimethyl ammonium acetate, glycidyl triethyl ammonium chloride, glycidyl triethyl ammonium bromide, glycidyl tripropyl ammonium chloride, glycidyl tributyl ammonium chloride, glycidyl triisopropyl ammonium chlorides, N-3,4-epoxybutyl trimethyl ammonium chloride, N-3,4-epoxybutyl triethyl ammonium bromide, N-4,5-epoxyamyl trimethyl ammonium chloride, dimethylamino-2,3-epoxypropane, diethylamino-2,3-epoxypropane, dibutylamino-2,3-epoxy-propane, methyl ethyl amino-2,3-epoxypropane, diethylamino-3,4-epoxybutane, dimethylamino-4,5-epoxypentane.

Generally, it is suitable to use per mole of starch, calculated as anhydro glucose unit in the dry material, about 0.005 to 0.5 mole of epoxide, preferably 0.01 to 0.3 mole of epoxide.

According to the invention the etherification of the starch with the alkylidene epoxides is carried out in a medium which contains 10 to 35 weight percent, especially 15 to 25 weight percent, water and about 0.2 to 2.0 weight percent, especially 0.4 to 1.5 weight percent calcium oxide or preferably calcium hydroxide.

The starch can be used in the commercial form in which it generally contains up to about 20 weight percent of water. With advantage the calcium hydroxide or calcium oxide is added in in the dry state and the epoxide employed as an aqueous solution. Hereby first the calcium hydroxide or calcium oxide can be mixed with the starch and then the epoxide solution added or conversely first the starch treated with the epoxide solution and then the calcium hydroxide or calcium oxide mixed in. The epoxide solution is suitably added in finely divided form, preferably by spraying. There can be used directly the reaction mixture obtained in producing the epoxide by reaction of the corresponding halohydrin with an alkaline acting material such as alkali hydroxide, e.g. sodium hydroxide or potassium hydroxide.

In a given case the reaction temperature depends to a certain extent according to the type of materials reacted. Generally temperatures of about 50° to 120° C. are used. Preferred are temperatures of 50° to 90° C. The pressure can be chosen as desired, so long as the volatility of the materials does not require the maintaining of specific minimum pressure. However, in many cases, it can be advantageous to reduce the water content of the reaction mixture during the reaction through vaporization and for this purpose to operate under reduced pressure.

Unless otherwise indicated all parts and percentages are by weight.

The process can comprise, consist essentially of the steps set forth with the recited materials.

DETAILED DESCRIPTION

EXAMPLE 1

1227 grams (6.17 moles) of native potato starch (water content 18.5%, insoluble nitrogen content 0.002%) were sprayed in the course of 10 minutes with a solution of 49.0 grams (corresponding to 0.31 mole) of a commercial glycidyl trimethylammonium chloride (content of glycidyl trimethylammonium chloride 92.5% and of 3-chloro-2-hydroxypropyltrimethylammonium chloride 3.5%) in 49 ml of water. The starch was continuously intensively stirred during this period and subsequently. 10 minutes after the addition of the glycidyl trimethylammonium chloride solution in the course of 5 minutes there were mixed in 10.5 grams of powdered, chemically pure calcium hydroxide. Then the mixture was heated to 80° C. 30 respectively 45 minutes later, samples were withdrawn, in each case 20 grams. The samples were slurried, in each case in 150 grams of water and acidified with diluted hydrochloric acid to pH 5. The solids were filtered off, washed twice with 150 ml of water each time and dried under reduced pressure at 70° C. The yield based on the glycidyl trimethylammonium chloride employed according to the sample withdrawn after 30 minutes was 91% and according to the sample withdrawn after 45 minutes was 93% calculated by the nitrogen content of the starch ether recovered considering the content of insoluble nitrogen in the starch employed. The degree of substitution of the cationic starch ether obtained was 0.0455 respectively 0.0465.

EXAMPLE 2

1000 grams (5.33 moles) of native corn starch (water content 13.5%, content of insoluble nitrogen 0.03%) was treated within 5 minutes with 10.5 grams of powdered, chemically pure calcium hydroxide. During the addition of the calcium hydroxide and subsequently the starch was continuously intensively stirred. Additionally, there were successively sprayed in the course of 5 minutes each 135 grams of water and a solution of 42.5 grams (corresponding to 0.27 mole) of a commercial glycidyl trimethylammonium chloride (content of glycidyl trimethylammonium chloride 92.5% and of 3-chloro-2-hydroxypropyl trimethylammonium chloride 3.5%) in 42.5 grams of water. The mixture was heated to 80° C. and held at this temperature for 45 minutes. The pressure in the meanwhile was held at 600 mbar for the purpose of evaporating water. The yield was 88% based on the glycidyl trimethylammonium chloride employed. The degree of substitution was 0.044.

EXAMPLE 3

The procedure was the same as in Example 2 but there were employed 1129 grams (6.17 moles) of native wheat starch (water content 11.4%, content of insoluble nitrogen 0.035%), 10.5 grams of calcium hydroxide and a reaction product of 102,3 grams (0.31 mole) of 3-chloro-2-hydroxypropyltrimethylammonium chloride in 56.7 percent aqueous solution with 12.5 grams (0.31 mole) of sodium hydroxide in 175 ml of water. The yield was 85%, the degree of substitution was 0.0425.

EXAMPLE 4

The procedure was the same as in Example 2 but there was used only 5.3 grams of calcium hydroxide. The mixture was held at 80° C. for 90 minutes after the addition of the glycidyl trimethylammonium chloride. The yield was 85%, the degree of substitution was 0.0425.

EXAMPLE 5

1227 grams (6.17 moles) of native potato starch according to Example 1 was mixed with 10.5 grams of calcium hydroxide. The mixture was sprayed with a solution of glycidyl trimethylammonium chloride according to Example 1. For the rest, the process was as in Example 1 but the reaction temperature was 60° C. After 60 minutes the yield was 83% and the degree of substitution 0.0415, after 90 minutes the yield was 87% and the degree of substitution 0.0435.

EXAMPLE 6

The procedure was as in Example 2 but there were mixed 1156 grams (6.17 moles) of native corn starch with 10.5 grams of calcium hydroxide. The mixture was sprayed with a solution of glycidyl trimethylammonium chloride which had been prepared by mixing an aqueous solution of 409 grams (1.23 moles) of 3-chloro-2-hydroxypropyltrimethylammonium chloride with a solution of 49.7 grams (1.23 moles) of sodium hydroxide in 140 ml of water. After 90 minutes reaction time the yield was 82% and the degree of substitution 0.164.

The entire disclosure of German priority application P No. 2949886.0 is hereby incorporated by reference.

What is claimed is:

1. A process for the production of a cationic starch ether comprising reacting starch with an alkylidene epoxide having a tertiary amino group or a quaternary ammonium group in aqueous alkaline medium at a temperature of 50° to 120° C. and wherein the medium contains about 10 to 35 weight percent of water and about 0.2 to 2.0 weight percent calcium hydroxide or calcium oxide.

2. The process of claim 1 wherein the alkylidene epoxide has a quaternary ammonium group.

3. The process of claim 2 wherein the quaternary ammonium group is the glycidyl trimethylammonium group.

4. The process of claim 3 wherein the alkylidene epoxide is glycidyl trimethylammonium chloride.

5. The process of claim 4 wherein there is employed 0.005 to 0.5 mole of epoxide per anhydroglucose unit of the starch.

6. The process of claim 5 wherein there is employed 0.01 to 0.3 mole of epoxide per anhydroglucose unit of the starch, there is employed 15 to 25 weight percent of water and 0.4 to 1.5 weight percent of calcium hydroxide or calcium oxide and the temperature is 50° to 90° C.

7. The process of claim 6 wherein the starch is potato starch, corn starch or wheat starch.

8. The process of claim 1 wherein there is employed 0.005 to 0.5 mole of epoxide per anhydroglucose unit of the starch.

9. The process of claim 8 wherein there is employed 0.01 to 0.3 mole of epoxide per anhydroglucose unit of starch, there is employed 15 to 25 weight percent of water and 0.4 to 1.5 weight percent of calcium hydroxide or calcium oxide and the temperature is 50° to 90° C.

10. The process of claim 1 wherein the alkylidene epoxide has the formula

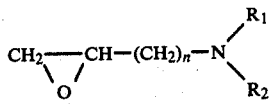 (I)

or

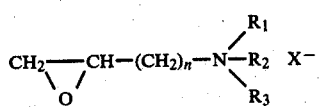 (II)

where n is a number from 1 to 3, $R_1$, $R_2$ and $R_3$ are alkyl groups of 1 to 4 carbon atoms where $R_1$ and $R_2$ can be joined to form a cycloalkylene ring, and X is an anion.

11. The process of claim 10 where n is 1.

12. The process of claim 11 where the alkylidene epoxide has formula II.

13. The process of claim 11 where X is the chloride anion.

14. The process of claim 10 where the alkylidene epoxide has formula II.

15. A process according to claim 1 wherein the reaction time is 30 minutes to 90 minutes.

16. A process according to claim 15 wherein the reaction is continued at least until the yield is at least 82% based on the epoxide employed.

17. A process according to claim 16 wherein there is employed glycidyl trimethylammonium chloride.

18. A process according to claim 17 wherein there is employed 0.01 to 0.3 mole of epoxide per anhydroglucose unit of the starch.

19. A process according to claim 18 wherein there is employed 15 to 25 weight percent of water.

20. A process according to claim 19 wherein the yield is 82 to 93%.

* * * * *